Figure 1:
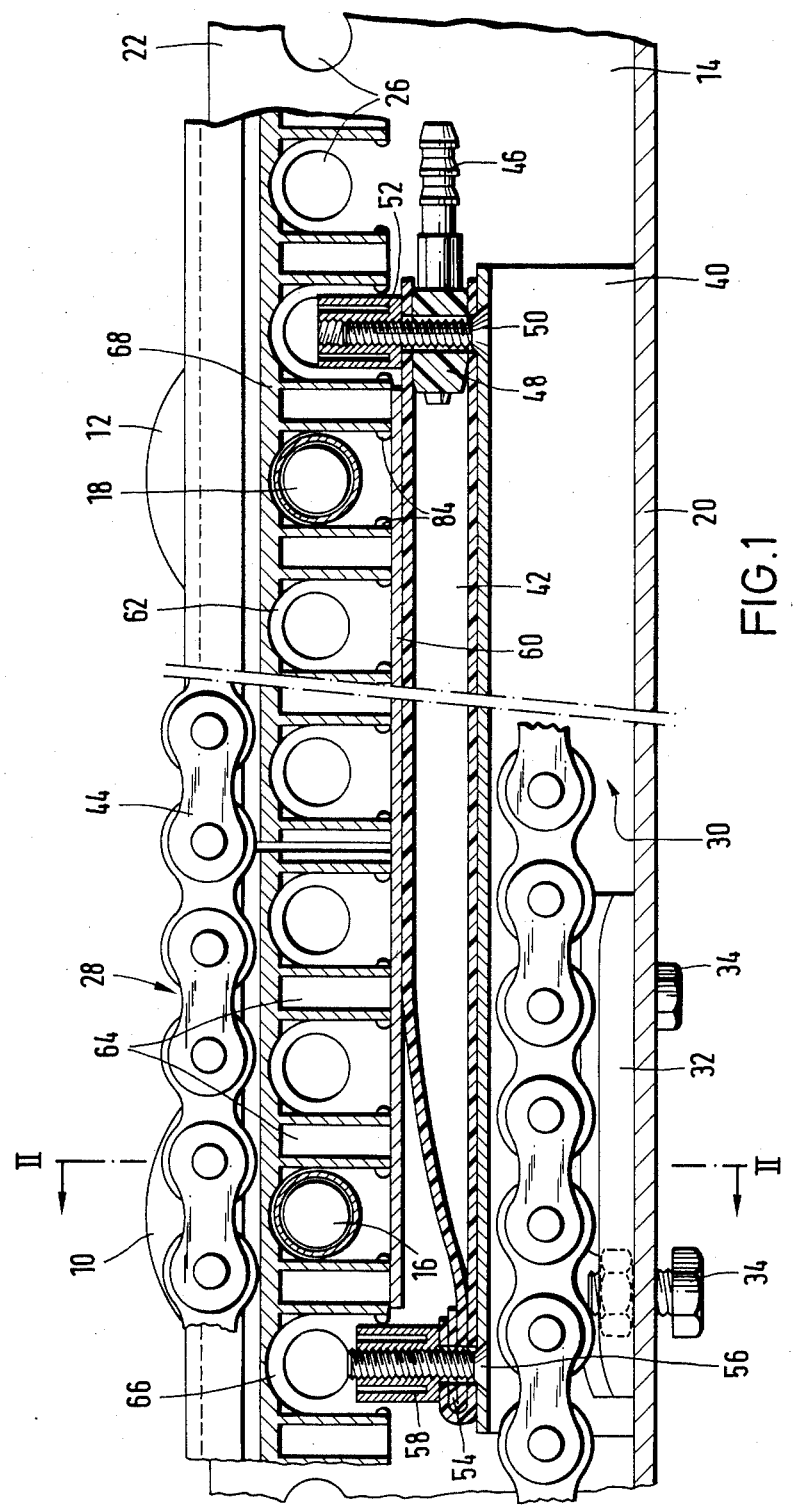

United States Patent [19]

vom Stein

[11] Patent Number: 4,732,265
[45] Date of Patent: Mar. 22, 1988

[54] APPARATUS FOR THE ACCUMULATING CONVEYING OF GOODS

[75] Inventor: Hans vom Stein, Wermelskirchen, Fed. Rep. of Germany

[73] Assignee: Interroll Fordertechnik GmbH & Co KG, Wermelskirchen, Fed. Rep. of Germany

[21] Appl. No.: 846,267

[22] Filed: Mar. 31, 1986

[30] Foreign Application Priority Data

Apr. 15, 1985 [DE] Fed. Rep. of Germany ... 8511014[U]

[51] Int. Cl.⁴ ............................................. B65G 15/22
[52] U.S. Cl. ..................................... 198/721; 198/809
[58] Field of Search ............... 198/347, 721, 718, 722, 198/725, 773, 774, 776, 781–783, 809; 414/525 B, 529, 535

[56] References Cited

U.S. PATENT DOCUMENTS

| | | | |
|---|---|---|---|
| 3,545,596 | 12/1970 | Turnbough | 198/721 |
| 3,650,376 | 3/1972 | Burgis et al. | 198/725 X |
| 3,838,769 | 10/1974 | Fishburne et al. | 198/774 X |
| 4,149,626 | 4/1979 | Holt | 198/718 |
| 4,219,113 | 8/1980 | Fieser et al. | 198/774 |
| 4,593,810 | 6/1986 | Cook | 198/721 X |

FOREIGN PATENT DOCUMENTS

| | | | |
|---|---|---|---|
| 2560169 | 8/1985 | France | 198/774 |
| 2573372 | 5/1986 | France | 414/535 |

*Primary Examiner*—L. J. Paperner
*Assistant Examiner*—Lyle K. Kimms
*Attorney, Agent, or Firm*—Anthony J. Casella; Gerald E. Hespos

[57] ABSTRACT

In an apparatus for accumulating conveying of goods constructed in the form of a roller conveyor with rollers (10, 12) in which via inflatable hose sections (42) a chain (28) is adapted to be brought into engagement with the goods to be conveyed, between the chain (28) and each hose section (42) a support and guide profile for the chain (28) is disposed in a U profile (14). The support and guide profile (62) is made in the form of a comb with teeth (64) and between every two teeth (64) the shaft journals (16, 18) carrying the rollers (10, 12) can be accommodated. By this arrangement the U profile (14) may be made very narrow.

15 Claims, 5 Drawing Figures

APPARATUS FOR THE ACCUMULATING CONVEYING OF GOODS

The invention relates to an apparatus for the accumulating conveying of goods comprising a roller conveyor and a chain adapted to be brought into engagement with the goods to be conveyed via inflatable hose sections, between the chain and each hose section a support and guide profile being disposed and the chain, the support and guide profiles and the hose sections being arranged in an upwardly open U profile.

Such conveyors serve in particular for transporting goods arranged in similar boxes or crates or on similar pallets, the goods piling up from the start of the roller conveyor and for example being removed by a stacker. As soon as the first box or first pallet has been removed from the roller conveyor the following goods are further conveyed one section and new goods are transported until they have reached the first unoccupied section.

It is known to divide the rollers of the roller conveyor into two parts, i.e. each into two aligning rollers with one end secured to the side frame of the roller conveyor and with the inner end secured via unilaterally mounted shaft journals on a U profile extending centrally in the roller conveyor. Disposed in said U profile is a chain which during the operation of the roller conveyor is continuously driven and is reversed at the ends of the roller conveyor. For conveying the goods the chain is raised sectionwise via hose sections and support and guide profiles disposed between the hose sections and the chain so that the chain can engage the lower side of the boxes or pallets to be conveyed. In these known apparatuses the U profile disposed in the centre is made very wise so as to be able to accommodate the shaft journals for mounting the rollers and the support and guide profiles disposed therebetween.

The problem underlying the invention is to further develop an apparatus of the type according to the preamble so that the drive consisting of chain, hose sections and support and guide profiles is more compact and reliable and safer and the mounting of the rollers is improved.

According to the invention the solution of this problem is achieved in that the support and guide profile is constructed as comb profile and that the teeth are directed downwardly to the hose section. In a support and guide profile formed in this manner according to the invention the great advantage is achieved in that the shaft journals provided for mounting the rollers on the U profile can be formed as pins which pass through the U profile and the ends of which project laterally out of said U profile for mounting the rollers. In the intermediate spaces between two adjacent teeth of the support and guide profile the shaft journals can be accommodated so that the U profile can be made with less width because the support and guide profile need not run between the ends of two shaft journals.

According to a preferred embodiment the teeth are made double-walled and the base face between the teeth is rounded. By this construction material and weight of the support and guide profile re saved and by the rounding the support and guide profile can bear excellently on the shaft journals when no raising of the profile is effected by the hose. This achieves at the same time that when the hose is not inflated the support and guide profile resting on the shaft journals does not load the hose.

In a further development on the surface of the support and guide profile opposite the teeth side legs are disposed which can preferably be bent once or twice outwardly. Said side legs improve the lateral guiding of the support and guide profile during operation, i.e. during the raising and lowering of the chain.

Furthermore, preferably at the surface opposite the teeth, i.e. between the side legs, in the centre a chain guide is disposed on the support and guide profile and preferably consists of a rib of rectangular cross-section so that the rollers of the chain rest on said rib and the connecting chain members pass by laterally.

To provide a sort of transport securing means, in a further development of the invention at the ends of the teeth knobs are disposed so that the support and guide profiles form with the shaft journals a sort of snap-action fit. This prevents the support and guide profiles from being able to drop out of the U profile on transport or installation of the sections.

To make a smooth joint between two adjacent support and guide profiles preferably each support and guide profile is tapered at one end to form overlap joints and at the other end formed with an inner recess so that one end of the supporting guide profiles engages over an end of another support and guide profile whilst the other end of the first support and guide profile is in turn engaged over.

To avoid that with the arrangement of the shaft journals on tightening of the securing nuts a deforming of the U profile occurs preferably on the shaft journals in the interior of the U profile spacer bushes are disposed which engage with their end faces against the inner faces of the U profile.

In further development of the invention between each support and guide profile and the associated hose section a metal rail is disposed so that the teeth ends engage said metal rail and prevent damage of the hose. The hose sections rest on U profiles which are arranged with their opening directed downwardly on the base of the continuous U profile. Within said U profiles carrying the hose sections on the base of the continuous U profile chain guide profiles are disposed for guiding the lower run of the circulating chain. Said chain guide profiles preferably comprise a rib of rectangular cross-section on which the rollers of the chain slide.

According to a preferred embodiment the support and guide profiles and the chain guide profiles consist of plastic and in particular nylon. To provide a guiding for the hose sections disposed on the inverted U profiles the hose sections have at the end upwardly projecting guide pins which are accommodated between the teeth of the support and guide profile.

Figure 2:
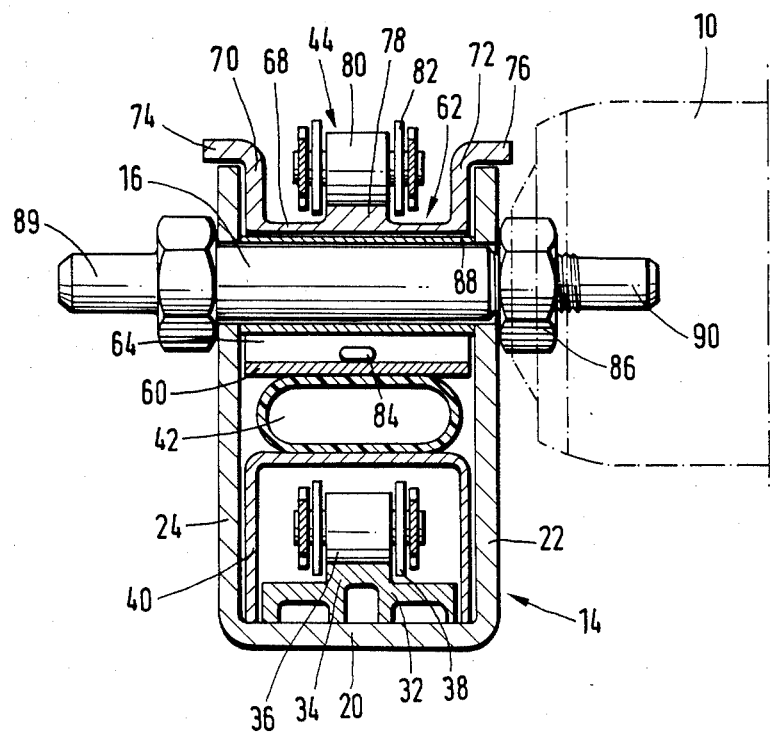
Figure 3:
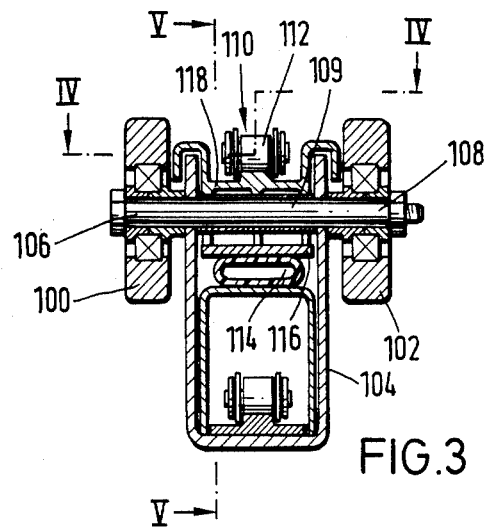
Figure 4:
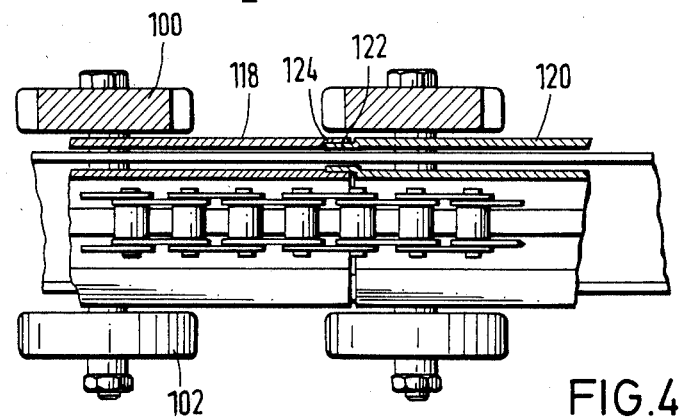
Figure 5:
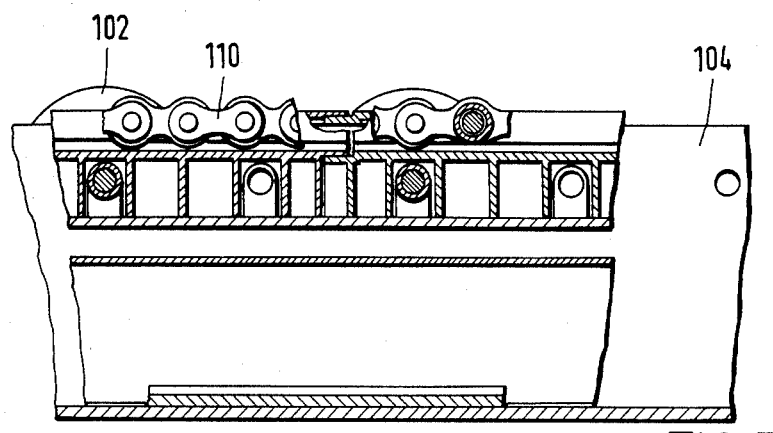

Examples of the invention will be explained hereinafter with the aid of the drawings, wherein:

FIG. 1 shows a section of the drive of an accumulating conveyor in section,

FIG. 2 a section along the line II—II of FIG. 1,

FIG. 3 a section through the drive of a modified embodiment of an accumulating conveyor, FIG. 4 a section along the line IV—IV of FIG. 3 and FIG. 5 a section along the line V—V of FIG. 3.

FIG. 1 shows a drive section of an accumulating conveyor. Rollers 10, 12 are indicated which are mounted between a side strut, not shown, of the frame of the roller conveyor and a U profile 14 disposed in the centre. The roller 10 is mounted on a shaft 16 and the roller 12 on a shaft 18. The U profile 14 is arranged in such a manner that from the base 20 disposed below side legs 22 and 24 are directed upwardly. In the side legs at predetermined spacing bores 26 are disposed which serve to secure rollers. For the drive of the goods which are conveyed on the rollers 10 and 12 and are not shown an endless chain 28 is provided which runs over the entire length of the roller conveyor. The lower run 30 of the chain 28 runs over the base 20. For guiding the lower run 30 chain guide profiles 32 are secured via screws 34 to the base 20 of the U profile 14. The chain guide profiles 32 are not continuous over the entire length of the U profile 14 but have a suitable length. As apparent from FIG. 2 at the upper side of each chain profile 32 a rib 34 of rectangular cross-section is disposed on which the rollers 36 of the chain slide, the chain links or members 38 being guided laterally at the rib 34.

The chain guide profiles 32 and the lower run 30 of the chain 28 are covered by U profile sections 40 whose opening is directed downwardly to the base 20 of the U profile 14. The U profile sections 40 carry hose sections 42 with the aid of which the upper run 44 of the chain 28 can be raised sectionwise when via a line which is not shown and which is connected to a connection piece 46 compressed air is injected into the interior of the hose section 42. The connection piece 46 is inserted into a closure piece 48 which seals the front end of the hose. For this purpose a screw 50 is led through the base of the U profile 40 and the closure piece 48. At the upper side of the hose section 42 the screw 50 is screwed into a pin 52 which presses the hose wall against the closure piece 48 and thus seals the hose. The rear end 54 of the hose 42 is folded over. A screw 56 screwed through the base of the U profile 40 is screwed into a pin 58, thus compressing the end 54 in air-tight manner.

On the upper side of the hose section 42 a metal rail 60 is disposed. On this metal rail 60 there is a support and guide profile 62 on the upper side of which the upper run 44 of the chain 28 runs. The support and guide profile 62 is formed as comb profile and comprises prongs or teeth 64 which for saving material and weight are made double-walled. The spacing between two teeth is equal to the spacing of two holes 26 so that the support and guide profile 62 can be arranged independently of the spacing of the rollers 10 and 12. With the support and guide profile 62 in place the shaft journals 16 and 18 for the rollers 10 and 12 and their corresponding rollers disposed between the opposite strut of the support frame and the U profile 14 extend between two teeth 64. For this purpose the base face 66 provided between two teeth 64 is rounded so that the profile can rest properly on the shaft journals 16 and 18.

Whereas the teeth 64 extend downwardly from one support face 68, from the upper side of the support face 68 side legs 70 and 72 extend upwardly. Said side legs, whose ends 74 and 76 respectively may be bent over once or twice, improve the lateral guiding of the support and guide profile 62 and the ends, when the hose is not inflated, can rest on the ends of the legs 22 and 24 of the U profile 14. Integrally formed in the centre of the face 68 and its upper side between the side legs 70 and 72 is a chain guide 78 which consists of a rib of substantially rectangular cross-section. The rollers 80 of the upper run 44 of the chain 28 slide on said rib 78 and the chain members 82 are guided laterally at the chain guide 78.

On the teeth 64 knobs 84 are provided which after fitting of the support and guide profile 62 on the shafts 16 and 18 form a sort of snap-action fit so that the support and guide profile 62 cannot be detached again without applying a force. This provides transport securing.

To avoid deformation of the legs 22 and 24 of the U profile 14 occurring on attachment of the shaft journals 16 and 18 in the U profile 14 due to excessive tightening of a nut 86, on each shaft journal 16 and 18 a bush 88 is provided whose end sides engage the inner sides of the legs 22 and 24. Said bushes 88 consequently serve as spacers. FIG. 2 shows shaft journals 89 and 90 formed on the shaft for the roller 10 and a corresponding roller on the other side.

In the embodiment shown in FIGS. 3 to 5 instead of wide rollers smaller rollers 100, 102 are mounted on the ends 106 and 108 of a shaft journal 109 projecting beyond the outer side of a U profile 104. In the U profile 104 a chain 110 is guided and the upper run 112 of the chain is raised via hose sections 114 on which via a metal rail 116 support and guide profiles 118 are disposed which as in the embodiment according to FIGS. 1 and 2 are formed with teeth or prongs.

As apparent in particular from FIGS. 4 and 5 a support and guide profile 120 is made tapered at the end 122 whilst the support and guide profile 118 is provided at the end 124 with an inner recess so that the end 122 of the support and guide profile 120 can be inserted into the end 124 of the support and guide profile 118. This gives a gapless arrangement of support and guide profiles arranged one behind the other. The further constructional details shown in FIGS. 3 to 5 correspond to those in FIGS. 1 and 2.

The shaft journals give a travel limitation for the support and guide profile because the metal rail on inflation of the hose section engages the lower side of the shaft journals and prevents further raising of the upper run of the chain.

I claim:

1. Apparatus for the accumulating conveying of goods comprising: a roller conveyor and a chain adapted to be brought into engagement with the goods to be conveyed via inflatable hose sections; between the chain and each hose section a support and guide profile being disposed; and the chain, the support and guide profiles, and the hose sections being arranged in an upwardly open U-shaped profile having a pair of side legs and a base, characterized in that rollers (10, 12) are disposed on continuous pins (16, 18) with shaft journal (89, 90) mounted to the U-shaped profile, and that the support and guide profile (62) is constructed as comb profile having teeth (64) directed downwardly to the hose section (42), said continuous pins (16, 18) being disposed intermediate adjacent teeth, such that space between the teeth permit the support and guide profile (62) to move relative to the pins (16, 18) in response to inflation or deflation of said hose sections.

2. Apparatus according to claim 1, characterized in that the spacing of the teeth (64) is equal to the spacing of holes (26) in the side legs (22, 24) of the U-shaped profile (14) for securing the rollers (10, 12).

3. Apparatus according to claim 2, characterized in that the teeth (64) are made double-walled.

4. Apparatus according to claim 3, characterized in that the support and guide profiles define rounded base faces (66) between the teeth (64).

5. Apparatus according to claim 4, characterized in that the support and guide profile comprises a support face (68) from which the teeth (64) extend and from which support side legs (70, 72) extend from the surface of the support face (68) opposite the teeth (64).

6. Apparatus according to claim 5, characterized in that the support side legs (70, 72) terminate at ends (74, 76) which are bent once or twice outwardly.

7. Apparatus according to claim 6, characterized in that the surface of the support face (68) includes a chain guide (78) disposed substantially centrally between said support side legs.

8. Apparatus according to claim 7, characterized in that at the ends of the teeth (64) knobs (84) are arranged.

9. Apparatus according to claim 8, characterized in that each support and guide profile (118, 120) is tapered at one end (122) for forming overlap joints and at the other end (124) is formed with an inner recess.

10. Apparatus according to claim 1, characterized in that on the pins (16, 18) in the interior of the U-shaped profile (14) spacer bushing (88) are disposed.

11. Apparatus according to claim 10, characterized in that between each support and guide profile (62) and the associated hose section (42) a metal rail (60) is disposed.

12. Apparatus according to claim 11, characterized in that on the base (20) in the interior of the U-shaped profile (14) chain guide profiles (32) are disposed.

13. Apparatus according to claim 12, characterized in that the support and guide profiles (62) and the chain guide profiles (32) comprise of plastic.

14. Apparatus according to claim 13, characterized in that the plastic is nylon.

15. Apparatus according to claim 14, characterized in that at the ends of the hose sections (42) guide pins (52, 58) are disposed and the guide pins (52, 58) are received between teeth (64) of the support and guide profile (62).

* * * * *